United States Patent [19]

Wildmoser

[11] 4,115,182

[45] Sep. 19, 1978

[54] SEALING MEANS

[75] Inventor: Martin Michael Wildmoser, Staten Island, N.Y.

[73] Assignee: Arenco Machine Company, Teterboro, N.J.

[21] Appl. No.: 810,965

[22] Filed: Jun. 29, 1977

[51] Int. Cl.² .................. B32B 31/00; B30B 15/34
[52] U.S. Cl. ............................... 156/515; 156/583
[58] Field of Search .................. 156/515, 251, 583

[56] References Cited

U.S. PATENT DOCUMENTS

| 3,453,801 | 7/1969 | Stohlquist | 156/583 |
| 3,672,116 | 6/1972 | Ingmarson | 156/583 |
| 3,874,976 | 4/1975 | MacFarland, Jr. | 156/515 |
| 3,933,569 | 1/1976 | Grasvoll | 156/515 |

*Primary Examiner*—Douglas J. Drummond

*Attorney, Agent, or Firm*—Lerner, David, Littenberg & Samuel

[57] ABSTRACT

An improved sealing apparatus is provided for cutting and heat sealing thermoplastic sheets which are drawn under tension through relatively movable sealing jaws which include heat-applying and cutting means. Coacting male and female sections are provided on the sealing jaws for preventing the thermoplastic sheets from engaging the heat-applying means while the thermoplastic sheets are being drawn under tension through the jaws. In addition, such sections also perform the additional function of applying a clamping force to the thermoplastic sheets when the jaws are in their closed position to overcome the tension on the thermoplastic sheets to thereby prevent slippage of the thermoplastic sheets relative to the sealing jaws during the heat-sealing operation.

8 Claims, 4 Drawing Figures

SEALING MEANS

FIELD OF THE INVENTION

The present invention relates generally to sealing apparatus and specifically to an improved heat-sealing apparatus which is constructed to prevent the material to be heat sealed from engaging the heat-applying means while the jaws are open and to apply a clamping force to the material to be heat sealed when the jaws are closed.

BACKGROUND OF THE INVENTION

Sealing apparatus for sealing sheets of thermoplastic material are well known in the prior art. Typically, the sealing apparatus may include a pair of relatively movable sealing jaws, with one or both of the faces of the opposed sealing jaws being formed of rubber or similar material, or being coated with Teflon or similar material, to prevent sticking of the thermoplastic material to the jaws during the sealing operation. In addition, at least one of the sealing jaws typically includes heating means, such as an impulse wire, which when charged with current, is heated to the desired sealing or welding temperature. The impulse wire thereby operates to fuse adjacent sheets of thermoplastic material to each other.

Such sealing apparatus is typically employed in shrink-wrapping of packages or for merely sealing plastic pouches or packages. In such cases, the thermoplastic sheets are not under tension, and there is not tendency to move the thermoplastic sheets relative to the sealing jaws. In fact, if conventional sealing jaws were employed to heat seal thermoplastic sheets in a stretch-wrapping situation wherein the sheets are under tension, the thermoplastic sheets would tend to slide or slip relative to the Teflon-coated or silicone rubber jaws, as conventional sealing jaws do not provide a sufficient clamping force to overcome the tension on the thermoplastic sheets which is required in stretch-wrapping apparatus.

In addition, in conventional sealing jaws, the heating means, such as the impulse wire, protrudes from the surface of the sealing jaw. Accordingly, if a thermoplastic sheet was to be drawn through the jaws when the jaws are in their open position, the impulse wire would operate to damage or cut the thermoplastic sheet which is passing over it during a stretch-wrapping operation. Accordingly, conventional sealing jaws would not be suitable in stretch-wrapping operations wherein the thermoplastic sheets are drawn between the sealing jaws before the sealing operation takes place.

There are also new materials being employed in stretch-wrapping operations which are not susceptible to heat sealing on conventional sealing jaws. More particularly, foam-type thermoplastic materials are now being employed in stretch-wrapping operations. Such foam-type thermoplastics, such as Dupont's Microfoam, fabricated from a polypropylene resin, cannot be heat sealed on conventional apparatus. Such Microfoam material, upon being heated to its melting point, simply vaporizes and does not allow the sheets to fuse to each other. Accordingly, it would also be desirable to provide sealing jaws while would operate to heat seal such foam-type thermoplastic materials to provide a sufficiently strong seal.

Broadly, it is an object of the present invention to provide improved sealing means which overcome one or more of the aforesaid problems. Specifically, it is within the contemplation of the present invention to provide improved sealing jaws which are constructed so as to be suitable for heat sealing thermoplastic sheets which are under tension, and particularly those which are utilized in stretch-wrapping operations.

It is a further object of the present invention to provide improved sealing jaws which may be utilized to heat seal thermoplastic sheets which are under tension, such as in stretch-wrapping operations, wherein the sealing jaws provide a sufficient clamping force to overcome the tension applied to the thermoplastic sheets and to prevent slippage of the thermoplastic sheets relative to the sealing jaws during the sealing operation.

It is a still further object of the present invention to provide improved sealing jaws which are constructed to prevent the thermoplastic sheets which are drawn between the sealing jaws from engaging the heating means so as to prevent the thermoplastic sheet from being damaged or torn by the heating means.

It is a still further object of the present invention to provide improved sealing jaws which are especially suitable for heat sealing foam-type thermoplastic materials to provide a sufficiently strong seal.

SUMMARY OF THE INVENTION

Briefly, in accordance with the principles of the present invention, an improved sealing apparatus is provided for cutting and heat sealing thermoplastic sheets which are drawn under tension through a pair of relatively movable sealing jaws, which are movable between an open and closed position. To provide an improved heat seal, at least one of the sealing jaws is formed of silicone rubber which is deformable upon the closing of the jaws. In addition, heat-applying and cutting means, preferably in the form of a heater wire, is disposed adjacent at least one of the sealing jaws for applying heat to cut and heat seal the thermoplastic sheets. Moreover, coacting male and female clamping sections are provided on the respective sealing jaws for applying a clamping force to the thermoplastic sheets when the jaws are closed to overcome the tension on the thermoplastic sheets and to thereby prevent slippage of the sheets relative to the sealing jaws during the sealing operation. In addition, the clamping sections on one of the sealing jaws also performs the additional function of preventing the thermoplastic sheets from engaging the heat-applying means, such as the heater wire, while the sealing jaws are in their open position and the thermoplastic sheets are being drawn under tension through the sealing jaws from rolls supplying the thermoplastic material.

Advantageously, as a result of the present invention, the improved sealing jaws may be utilized to heat seal thermoplastic sheets which are under tension, such as in stretch-wrapping operations, wherein the improved sealing jaws provide a sufficient clamping force to overcome the tension applied to the thermoplastic sheets and to prevent slippage of the thermoplastic sheets relative to the sealing jaws during the sealing operation. In addition, the improved sealing jaws of the present invention are constructed to partially surround the heat-applying means which allow the thermoplastic sheets to be drawn between the sealing jaws without engaging the heat-applying means so as to prevent the thermoplastic sheets from being damaged or torn or cut by the heat-applying means. Also, as a result of the present invention, the improved sealing jaws are constructed to allow foam-type thermoplastic material to be heat sealed, whereas conventional sealing jaws have been unable to accomplish this.

BRIEF DESCRIPTION OF THE DRAWINGS

Further objects, features, and advantages of the present invention will become apparent upon the consideration of the following detailed description of a presently preferred embodiment when taken in conjunction with the accompanying drawings, wherein.

DETAILED DISCUSSION OF PREFERRED EMBODIMENT OF THE INVENTION

Figure 1:
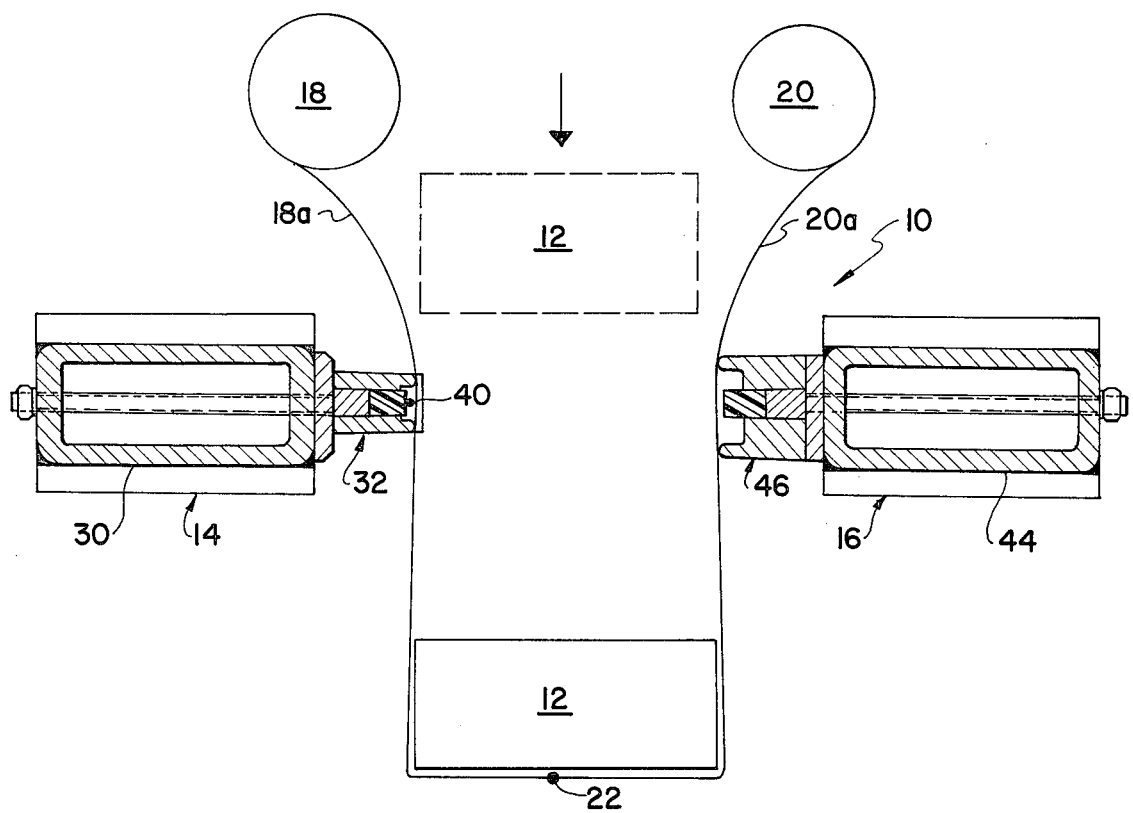
FIG. 1 is a plan view partially illustrating stretch-wrapping apparatus embodying the improved sealing jaws of the present invention.

Referring now to FIG. 1, there is shown stretch-wrapping apparatus employing the present invention, generally designated by the reference numeral 10. In the stretch-wrapping apparatus, a pallet load 12 is transported in a forward direction between sealing jaws 14, 16. As the pallet load 12 moves forwardly, it pulls or unwraps thermoplastic material from supply rolls 18, 20, with the thermoplastic sheet supplied by roll 18 being designated 18a and with the thermoplastic sheet supplied by roll 20 being designated 20a. The apparatus for supplying thermoplastic sheets 18a, 20a from respective supply rolls 18, 20 is conventional and need not be discussed in detail, as it will be understood that the thermoplastic material is being supplied via suitable dancer rolls and tension rollers (not shown). There is also shown in FIG. 1 a heat seal 22 which has been formed during the previous cycle of the sealing apparatus of the present invention for joining sheets 18a, 20. In order to complete the stretch-wrapping operation of the thermoplastic sheets around pallet load 12, the next seal to be formed will be on the opposite side of pallet load 12 after it passes between sealing jaws 14, 16.

It should also be understood that any suitable thermoplastic sheet may be employed for the stretch-wrapping operation and may include, but is not limited to, polypropylene, PVC, polyethylene, and polystyrene. However, the novel sealing apparatus of the present invention has particular application to foam-type thermoplastic materials, such as that fabricated from polypropylene resin and which is commercially available from Dupont under the trademark Microfoam. Such foam-type materials may be characterized by the fact that they are very lightweight and contain air bubbles to give the foam-like appearance. Such material is also characterized by the fact that when heat is applied directly to it, the material dissipates or vaporizes and does not appear to leave any residue which may be employed to fuse sheets together. Accordingly, it is a primary object of the present invention to provide a sealing jaw which has particular utility with respect to heat-sealing materials which have this vaporizing characteristic.

Referring now specifically to the construction of the sealing jaws, sealing jaw 14 is formed from a tubular-like frame 30 for supporting a vertically-extending jaw member 32. Jaw member 32 includes sidewall members 34, 36 which enclose or encase a sealing member 38. In the preferred embodiment, sidewall members 34, 36 are disposed at a slight angle with respect to each other and are bolted together to hold sealing member 38 therebetween. Sealing member 38 is preferably formed of silicone rubber which has a hardness in the range of 60 to 75 durometers and which is deformable when sealing jaws 14, 16 are closed. The ends 34a, 36a of respective sidewalls 34, 36 extend beyond the deformable sealing member 38 and are constructed to partially enclose a suitable heating element 40, such as an impulse heater wire, which operates, in a manner to be explained, to cut thermoplastic sheets 18a, 20a and to seal each end of sheet 18a to the corresponding end of sheet 20a. In addition, in a manner to be explained, the ends 34a, 36a of sidewalls 34, 36 also serve to function as a portion of a clamp for clamping the thermoplastic sheets between the sealing jaws 14, 16.

Referring now specifically to the construction of sealing jaw 16, it is also formed from a tubular frame 44 which is constructed to support a vertically extending jaw member 46. As shown in detail in FIG. 2, jaw member 46 includes sidewall members 48, 50 which enclose and support a sealing member 52. In the preferred embodiment, sealing member 52 is similar to sealing member 38 and is formed from silicone rubber, which is deformable upon the closing of the sealing jaws. In addition, sidewall members 48, 50 are clamped together to encase and support the sealing member 52. It should also be noted that the ends of sidewall members 48, 50 are shaped to form respective pockets 48a, 50a which serve a clamping function. As will be explained, female clamping sections 48a, 50a are adapted to cooperate with respective male clamping sections 34a, 36a for applying a clamping force to thermoplastic sheets 18a, 20a which are engaged between jaw members 32, 46 to prevent slippage of the sheets relative to the jaw members.

As explained above, in stretch-wrapping apparatus, the thermoplastic sheets 18a, 20a are drawn under tension through sealing jaws 14, 16 while the jaws are open. In accordance with the present invention, the ends 34a, 36a of sidewalls 34, 36 form guiding surfaces, as shown in FIG. 1, over which thermoplastic sheet 18a travels. The guiding surfaces operate to prevent thermoplastic sheet 18a from engaging heater wire 40 while the thermoplastic sheet 18a is being drawn through the jaws under tension. In this manner, guiding surfaces 34a, 36a function to prevent heater wire 40 from damaging or tearing or cutting the thermoplastic sheet 18a as it is being drawn through the jaws.

Figure 2:
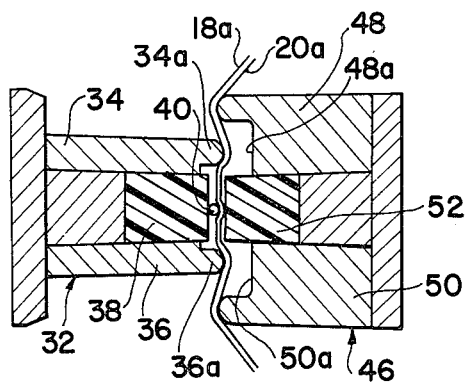
FIG. 2 is also a plan view, in detail, of the sealing jaw members in a partially closed position.
Figure 3:
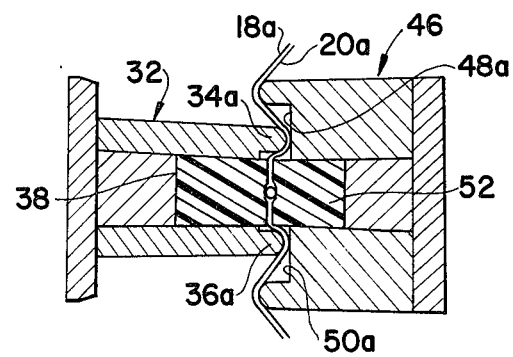
FIG. 3 illustrates the sealing jaws in their closed position and performing the cutting and heat-sealing operations.

Referring now to FIGS. 2 and 3, it is shown in detail how ends 34a, 36a of jaw member 32 also function as clamping members when jaws 14, 16 are closed. More particularly, as jaw members 32, 46 are brought into contact with each other, heater wire 40 will come into contact with thermoplastic sheets 18a, 20a, and clamping members 34a, 36a will apply a clamping force to the sheets 18a, 20a against cooperating clamping members 48a, 50a, respectively. As a result, the clamping force overcomes the tension on the thermoplastic sheets and thereby prevents the thermoplastic sheets from slipping or moving relative to the jaw members 32, 46 during the sealing operation.

Figure 4:
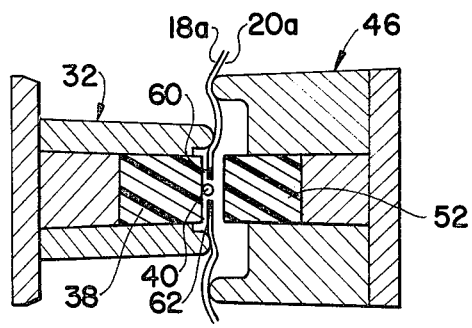
FIG. 4 is a detail view of a portion of the sealing jaws illustrating the completed heat seals.

Referring now to FIGS. 3 and 4, the details of the cutting and heat-sealing operation are clearly shown. More particularly, as will be noted, heater wire 40 is forced between silicone rubber sealing members 38, 52 and deforms them slightly. The heated impulse wire 40 operates to cut through thermoplastic sheets 18a, 20a by melting or vaporizing the thermoplastic material which it comes in direct contact with. In addition, heater wire 40 also functions to supply heat to the thermoplastic material in the adjacent areas on each side of the heater wire. In this manner, the peripheral heat supplied by heater wire 40 operates to fuse or melt the respective ends of thermoplastic sheets 18a, 20a to form a heat seal 60 on one side of heater wire 40 and a heat seal 62 on the other side of heater wire 40. Heat seal 62 joins the cut ends of thermoplastic sheets 18a, 20a to form the second seal (in addition to previously formed seal 22) for stretch-wrapping pallet load 12. In addition, new heat seal 60 which is provided also joins the cut ends of the thermoplastic sheets, so that as the new pallet load is pushed through the jaws 14, 16, it will operate to pull the thermoplastic sheets off of respective supply rolls 18, 20.

In the preferred embodiment, the impulse heater wire 40 is heated to a temperature in the range of 350° to 550° F. to melt the polypropylene material without melting the silicone rubber sealing members 38, 52 of the respective sealing jaws. It should also be noted that sealing jaw ends 34a, 36a which prevent the thermoplastic sheets from engaging heater wire 40 also provide the option of maintaining heater wire 40 always hot and at the desired melting temperature, rather than having to supply heat to wire 40 upon impulse only when the jaws are closed.

In accordance with the present invention, sealing jaws 14, 16 are maintained to contact until heat seals 60, 62 are cooled and completely formed. This allows the fused material of thermoplastic sheets 18a, 20a to bond at their edges adjacent impulse wire 40 to form the desired heat seals.

In view of the foregoing, it will be appreciated that the present invention has provided improved sealing jaws which are constructed so as to be suitable for heat sealing thermoplastic sheets which are under tension, such as in stretch-wrapping operations, wherein the improved sealing jaws provide a sufficient clamping force to overcome the tension applied to the thermoplastic sheets and to prevent slipping of the thermoplastic sheets relative to the sealing jaws during the sealing operation. In addition, as a result of the present invention, the thermoplastic sheets may be drawn between the sealing jaws without being damaged, cut, or torn by the heater wire disposed between the sealing jaws. It will also be appreciated that as a result of the present invention, the improved sealing jaws allow thermoplastic sheets, especially of the foam type, to be heat sealed which has not been possible on conventional sealing jaws.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Improved sealing apparatus for cutting and heat sealing thermoplastic sheets which are drawn under tension through sealing jaws, comprising:

first and second sealing jaws movable between an open and closed position and each including a sealing section integrally formed with and recessed relative to first and second spaced-apart clamping sections, the sealing section of at least one of said sealing jaws being deformable upon closing of said jaws, heat-applying and cutting means adjacent at least one of said sealing sections for applying heat to cut and heat seal said thermoplastic sheets, and one of said first and second spaced-apart clamping sections including means for preventing said thermoplastic sheets from engaging said heat-applying means while said sealing jaws are open and said thermoplastic sheets are being drawn under tension through said sealing jaws, said first and second spaced-apart clamping sections on each of said sealing jaws including means for coacting with each other to simultaneously apply a clamping force to spaced-apart portions of said thermoplastic sheets when said jaws are closed to overcome the tension on said thermoplastic sheets and to thereby prevent slippage of said thermoplastic sheets relative to said sealing jaws, and said recessed sealing sections being constructed and arranged to simultaneously move with said clamping sections to engage and seal said thermoplastic sheets after said thermoplastic sheets are clamped by said clamping sections.

2. Apparatus in accordance with claim 1, wherein said means for preventing engagement and for clamping include cooperating clamping surfaces adjacent said deformable jaw section for engaging and clamping said thermoplastic sheets.

3. Apparatus in accordance with claim 1, wherein said means for preventing engagement and for clamping include means formed on said sealing jaws for partially surrounding said heat-applying means so that said thermoplastic sheets are prevented from engaging said heat-applying means while said sealing jaws are open.

4. Apparatus in accordance with claim 1, wherein the deformable section of said sealing jaws is formed of silicone rubber.

5. Apparatus in accordance with claim 1, wherein said heat-applying and cutting means includes a heater wire which is heated to a point above the melting temperature of the thermoplastic material which is being heat sealed.

6. Apparatus in accordance with claim 1, wherein said means for preventing engagement and for clamping include coacting male and female sections for applying a clamping force to said thermoplastic sheets, said male and female sections being disposed on said sealing jaws on either side of said deformable sealing jaw section.

7. Apparatus in accordance with claim 7, wherein said male sections are in the form of extension members and extend beyond the surface of one of said sealing jaws for entering said female sections on the other of said sealing jaws.

8. Apparatus in accordance with claim 7, wherein said female sections are in the form of pockets formed in the surface of one of said sealing jaws for receiving said male sections on the other of said sealing jaws.

* * * * *